United States Patent [19]

Tysver et al.

[11] Patent Number: 5,307,630
[45] Date of Patent: May 3, 1994

[54] SYSTEM PRESSURE COMPENSATED VARIABLE DISPLACEMENT HYDRAULIC MOTOR

[75] Inventors: John D. Tysver, Rockford; Bruce A. Krandel, Cherry Valley; Wesley A. Burandt, Rockford, all of Ill.

[73] Assignee: Sundstrand Corporation, Rockford, Ill.

[21] Appl. No.: 808,422

[22] Filed: Dec. 16, 1991

[51] Int. Cl.⁵ ............................................. F16D 31/02
[52] U.S. Cl. ..................................... 60/451; 60/465
[58] Field of Search ................... 60/450, 451, 465, 493

[56] References Cited

U.S. PATENT DOCUMENTS

| | | | |
|---|---|---|---|
| 3,890,064 | 6/1975 | Boehringer et al. | 417/237 |
| 4,168,652 | 9/1979 | Bick | 91/502 |
| 4,195,479 | 4/1980 | Dezelan | 60/420 |
| 4,286,927 | 9/1981 | Boehringer | 417/271 |
| 4,635,441 | 1/1987 | Ebbing et al. | 60/450 |
| 4,712,377 | 12/1987 | Yoshida et al. | 60/444 |
| 4,768,340 | 9/1988 | Hamilton | 60/452 |
| 4,907,408 | 3/1990 | Barker | 60/451 |
| 5,062,265 | 11/1991 | Markunas | 60/451 |
| 5,065,577 | 11/1991 | Markunas | 60/451 |

FOREIGN PATENT DOCUMENTS 563530 11/1973 U.S.S.R. .

Primary Examiner—Edward K. Look
Assistant Examiner—F. Daniel Lopez
Attorney, Agent, or Firm—Wood, Phillips, VanSanten, Hoffmann & Frtel

[57] ABSTRACT

Paper drive unit instability that includes a variable displacement hydraulic motor (34), a rotary output (48), and a displacement controlling wobbler (36, 40) in the case of an aiding load can be avoided through the use of a double acting hydraulic actuator (42, 44) connected to the wobbler (36, 40) along with a control valve (30) including a single spool (80) connected to the motor (34), and wobbler control pilot valve (62) and to the actuator (42, 44) for a) controlling the speed and direction of rotation of the motor output (48); and b) controlling the actuator (42, 44) to maintain minimum displacement of the motor 34 when an aiding load occurs. System optimization can be achieved by changing the differential pressure setting in response to the available system pressure.

19 Claims, 3 Drawing Sheets

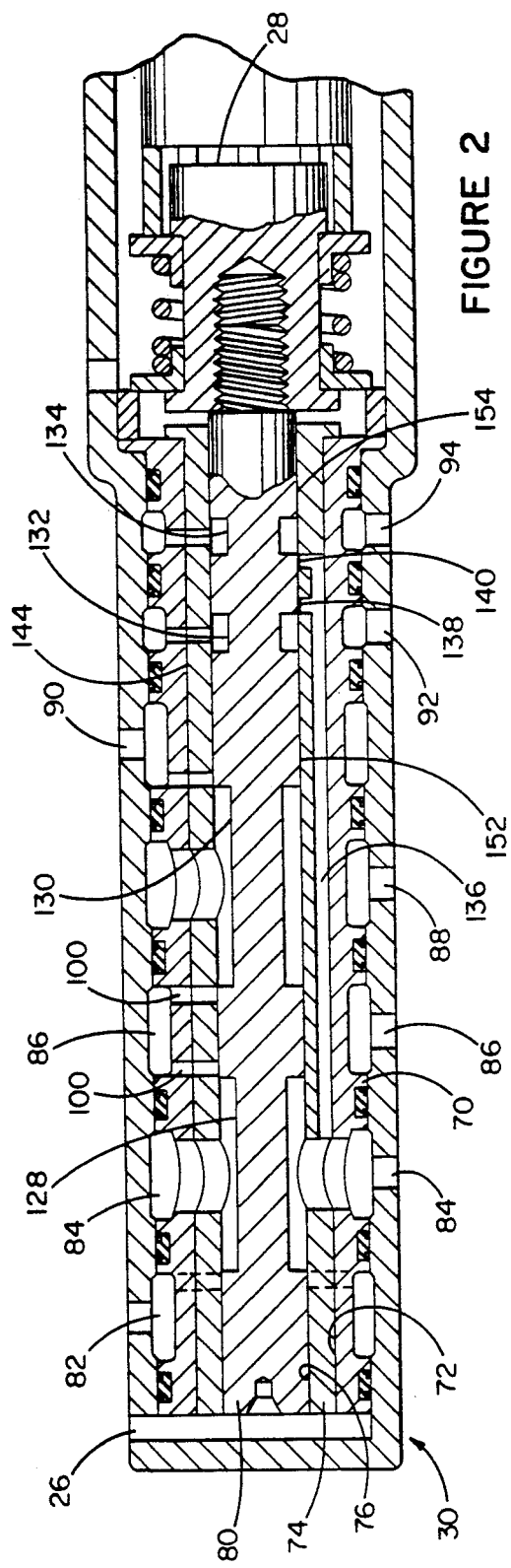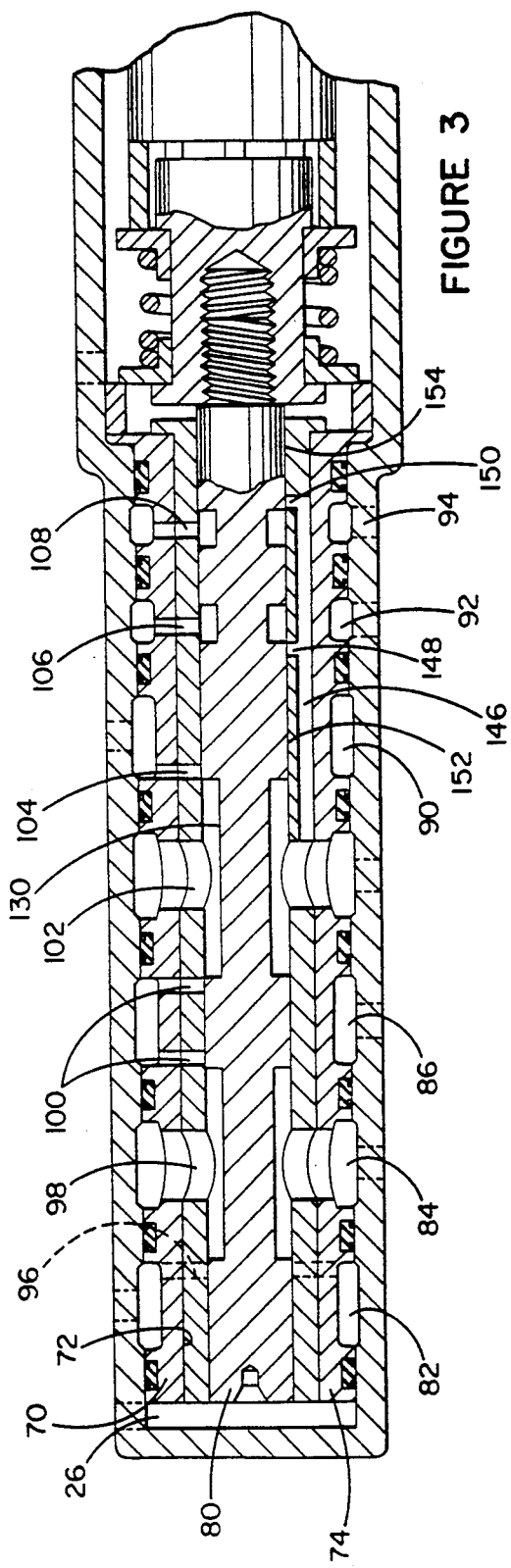

SYSTEM PRESSURE COMPENSATED VARIABLE DISPLACEMENT HYDRAULIC MOTOR

FIELD OF THE INVENTION

This invention relates to pressure compensated control system for an energy efficient variable displacement hydraulic motor.

BACKGROUND OF THE INVENTION

Power consumption is always of concern in aircraft. Power that is consumed in generating hydraulic fluid under pressure, electrical energy, etc. reduces the power available for propulsion and/or limits aircraft endurance as a result of the consumption of fuel in the operation of various hydraulic systems that otherwise might be expended in propelling the aircraft. Not untypically, in aircraft of more than basic simplicity, hydraulic systems are used for control purposes to change the aerodynamic configuration of the aircraft. In the usual case, hydraulic motors are mechanically connected to a control surface for the aircraft and through appropriate servo mechanisms, caused to operate to vary the aerodynamic configuration to some commanded configuration.

While such systems work well, when being operated under less than peak load, the volumetric flow demand of the hydraulic system may be considerably in excess of that required to meet the aerodynamic load. Consequently, power is consumed in unnecessarily pressurizing an unnecessarily large quantity of hydraulic fluid.

In an effort to avoid this and associated problems, it has been proposed to use variable displacement hydraulic motors in such aircraft systems. See, for example, U.S. Pat. No. 4,907,408 issued Mar. 13, 1990 to Barker.

When variable displacement hydraulic motors are employed, their displacement may be reduced for relatively light loads, thus requiring a lesser volumetric flow rate of hydraulic fluid in order to make the required system adjustment. However, in many hydraulic systems intended for aircraft, there is the possibility of experiencing a so-called aiding load. In such a case, aerodynamic forces acting on the control surface to be adjusted are aiding the system as it moves the surface. This, in turn, requires that the hydraulic motor act as a pump in order to maintain control of the position and the speed of the aircraft control surface. With prior art control schemes, in which the system modulates towards a higher displacement of the hydraulic motor as higher aiding loads occur, system instability may result and difficulty in properly moving the aerodynamic control surface to the desired position can occur.

Another difficulty occurs where the hydraulic system utilizes a variable pressure source. In such a case, the prior art has typically optimized the system to one particular pressure, namely, the pressure at which the system would most likely be operated. As a consequence of this optimization, operation at other pressures then becomes inefficient and undesirably increases power consumption.

The present invention is directed to overcoming the above problems.

SUMMARY OF THE INVENTION

It is the principal object of the invention to provide a new and improved pressure compensated control for a variable displacement hydraulic motor. More particularly, it is an object of the invention to provide such a system wherein system instability in the case of aiding loads is avoided and wherein optimization for operation at a variety of supply pressures is obtained.

An exemplary embodiment of the invention achieves the foregoing objects in a hydraulic drive system which includes a variable displacement hydraulic motor with a rotary output and a displacement controlling wobbler. The motor is adapted to be connected to a load that can be alternatively an opposing load or an aiding load. A double acting hydraulic actuator is connected to the wobbler for setting the displacement of the motor and means are provided, including a control valve having a single spool, that are connected to the motor and to the actuator for a) controlling the speed and direction of rotation of the output; and b) controlling the actuator to change the setting of the displacement of the motor.

In a preferred embodiment, the motor has two ports and the control valve is adapted to connect one motor port to a hydraulic fluid source and the other motor port to a hydraulic fluid return and the reverse to control hydraulic motor output direction. The actuator also has two ports. Two control pressures are communicated to the actuator for the wobbler. They are the pressures at the motor inlet and the motor outlet.

In a preferred embodiment, the system includes a means defining a system pressure compensated wobbler control pilot valve which is interposed between one of the actuator ports, the control valve, the source, and the return.

A preferred embodiment of the invention contemplates that the pilot valve include a valve member for alternatively connecting the one actuator port to the motor inlet and the return and a pressure activated biasing means for the valve member including a spring linked to the valve member along with a pressure activated piston connected to the source for selectively compressing the spring in response to pressure at the source.

This embodiment of the invention employs a piston having a first pressure surface connected to the source and a second, opposing pressure surface connected to the return.

In a highly preferred embodiment, an additional spring biases the piston in concert with the second pressure surface thereof.

A preferred embodiment of the pilot valve includes first, second and third ports along with a valve member movable to establish fluid communication between the first and second ports on the one hand and between the second and third ports on the other. The first port is connected to the system return and the second port is connected to the one actuator port. The third port is connectable to receive motor inlet pressure. The pilot valve further includes a spring biasing the valve member to a position connecting the second and third ports and means for sensing source pressure and for varying the bias provided by the spring in response thereto to thereby compensate the system set point for variations in available system pressure.

In a highly preferred embodiment, the sensing means comprises a movable piston having opposed pressure surfaces as mentioned previously and which is movable to vary the compression of the spring. One of the surfaces is connected to the source and acts against the spring, and the other is connectable to the return. An additional spring has provided to act on the piston in opposition to system pressure. Preferably, the additional spring has a spring rate and preload of at least about one order of magnitude greater than that of the first mentioned spring.

The invention also contemplates that the control valve with its single spool be movable in one direction from a centered position to connect one motor port to the source and the other motor port to the return as well as to be movable in the opposite direction from the centered position to connect the other motor port to the source and the one motor port to the return. When not in the centered position, the spool always connects the pilot valve to the motor inlet and the opposite end of the pilot valve and one of the actuator ports to the motor outlet.

Preferably, the control valve includes a housing having first through seventh laterally spaced ports with the first and fifth ports connected to the return, the third port connected to the source, and the second and fourth ports connected to the motor. A spool receiving bore is located in the housing with the spool therein and a sleeve is disposed in the bore about the spool and slidably receives the spool. The sleeve has first through seventh ports in fluid communication with the corresponding housing ports and further includes axial passages that interconnect the second housing port with either the sixth or the seventh sleeve ports when the spool is moved from the centered position dependent upon the direction of such movement and interconnect the fourth housing port with either the seventh or the sixth sleeve port when the spool is similarly moved from the centered position. The control valve just described is servo controlled to move the spool to appropriate positions in relation to the port openings for the purpose of controlling the speed of the hydraulic motor to restriction of hydraulic flow through the valve as necessary from the source to one motor port and from the other motor port to the return.

Other objects and advantages will become apparent from the following specification taken in connection with the accompanying drawings.

DESCRIPTION OF THE DRAWINGS

FIG. 2 is a sectional view of a control valve employed in the system taken at one radial location;

FIG. 3 is a sectional view of the control valve, but taken at a different radial location from that used in FIG. 2.

DESCRIPTION OF THE PREFERRED EMBODIMENT

Figure 1:
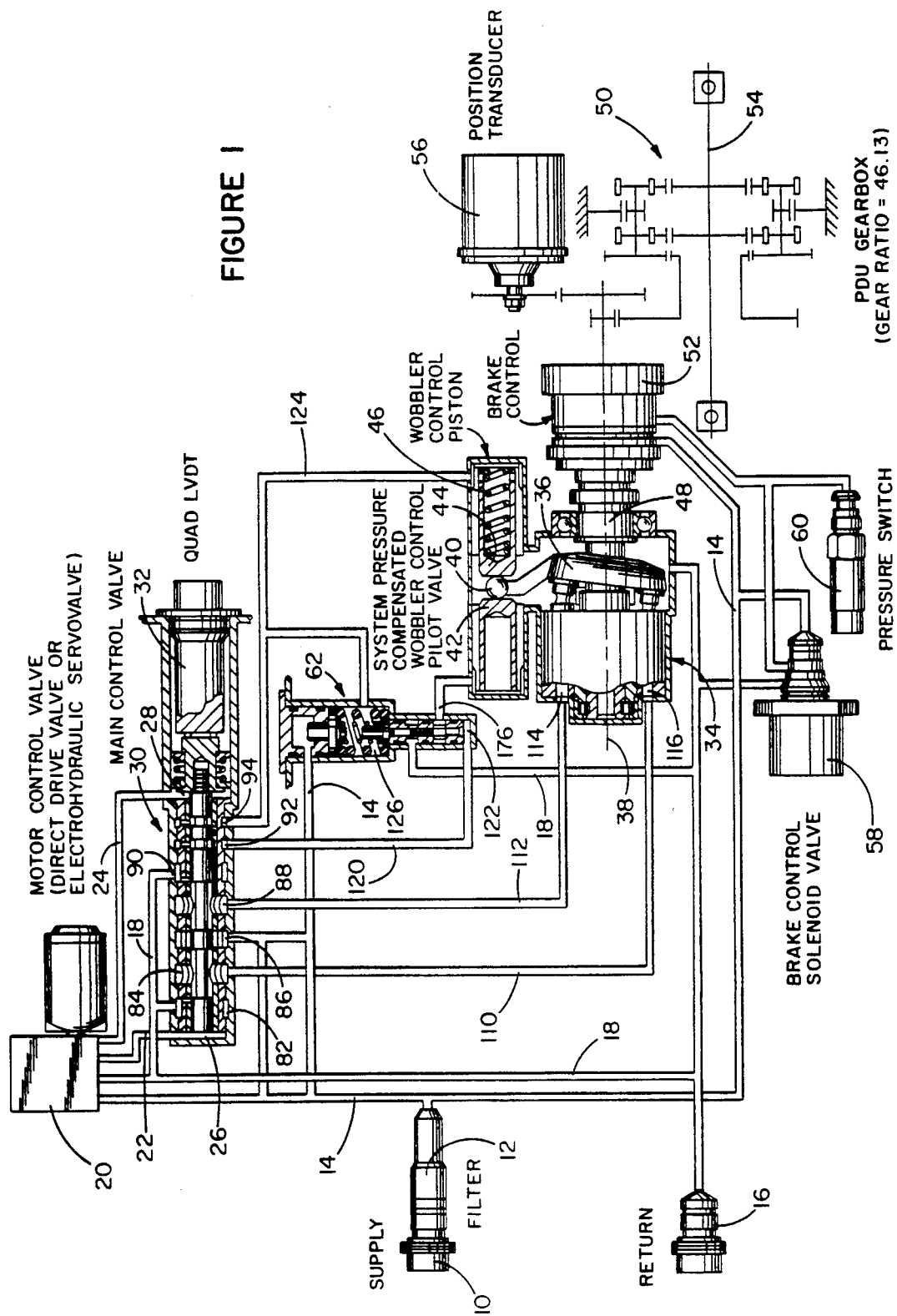
FIG. 1 is a partial schematic, partial sectional view of a hydraulic system made according to the invention.

An exemplary embodiment of the hydraulic system made according to the invention is illustrated in schematic form with some elements shown somewhat mechanically in FIG. 1. The same includes a supply 10 connected via a filter 12 to a supply line 14. The supply will typically be an engine driven pump that provides hydraulic fluid under pressure at a variable pressure.

Also included is a return represented by a fitting 16 connected to a return line 18.

A motor control valve (direct drive valve or electro-hydraulic servovalve) 20 of conventional construction is provided and is connected to both the supply and return lines 14, 18. The motor control valve 20 receives electrical command inputs in a conventional fashion and issues hydraulic commands to the system on lines 22 and 24 which extend to the control areas or pilots 26 and 28 of a main control valve, generally designated 30. Associated with the main control valve 30 is a conventional quad LVDT 32 which is employed conventionally as part of a known servo control system for sensing the position of the valve 30 and providing feedback signals to the system.

Also included is a variable displacement hydraulic motor, generally designated 34, of conventional construction. As is well-known the motor 34 includes a wobbler 36 which may have its angle relative to the rotational axis 38 of the motor 34 changed to vary the displacement of the motor 34. The wobbler 36 includes a control arm 40 which is disposed between oppositely directed pistons 42 and 44. The piston 44 is biased by a spring 46 as is well-known which tends to bias the wobbler control arm 40 in the counter-clockwise direction as viewed in FIG. 1 which is toward a minimum displacement position.

The output shaft 48 of the motor 34 is, of course, a rotary output shaft and is connected to a transmission schematically and generally illustrated at 50. A hydraulic braking assembly 52 is also connected to the output shaft to prevent its rotation when that is desired.

The transmission 50 includes an output shaft 54 which is adapted to be connected to the load to be moved. In the case of a typical load with which the system is to be employed in the case of use on an aircraft, the load applied to the shaft 54 may be an opposing load or it may be an aiding load, as is well-known.

A position transducer 56 is connected into the transmission 50 in a conventional fashion and provides position and speed feedback information for the servo control system.

Also included in the system is a brake control solenoid valve 58 which is operable to energize or de-energize the hydraulic brake 52 as need be along with a pressure switch 60 which is employed for system monitoring.

Interposed between various parts of the system, including specifically the control valve 30, the supply or source 10, the return 16 and the double acting actuator made up by the pistons 42, 44 for controlling the position of the wobbler 36, is a system pressure compensated wobbler control pilot valve, generally designated 62.

Referring now to FIGS. 2 and 3, the control valve 30 is seen to include a housing or outer sleeve 70 which in turn includes an internal, spool receiving bore 72. Within the bore 72 is an inner sleeve 74. In the usual case, the housing 70 may be shrink fitted upon the sleeve 74. The interior of the sleeve 74 is shown at 76 and slidably receives a single spool 80. As viewed in FIGS. 2 and 3, laterally along the length of the housing 70, from left to right, there are seven, laterally spaced ports. These ports are given the designations 82, 84, 86, 88, 90, 92 and 94. The sleeve 74 has a corresponding number of seven ports 96, 98, 100, 102, 104, 106 and 108 which are in fluid communication with the corresponding housing port. It is noted that the sleeve port 100 is implemented as two axially spaced ports, both of which are in fluid communication with the third port 86 in the housing 70.

As can be ascertained from a consideration of FIGS. 1 and 2, the first and fifth housing ports 82 and 90 are connected to the return line 18 while the third housing port 86 is connected to the supply line 14. The second and fourth ports 84 and 88 are respectively connected to lines 110 and 112, which in turn are respectively connected to first and second ports 116 and 114 on the variable displacement hydraulic motor 34. When the motor 34 is operating as a motor (as opposed to a pump), the port 116 will act as an inlet and the port 114 as an outlet.

The sixth port 92 is connected via a line 120 to a pilot chamber 122 forming part of the pilot valve 62. The seventh port 94 is connected via a line 124 to one side of the piston 44 opposite the wobbler control arm 40 and to a spring cavity 126 forming part of the pilot valve 62.

Returning now to FIGS. 2 and 3, the spool 80 is seen to include four radially outwardly opening, annular grooves. The first of these grooves is shown at 128 and is a relatively wide groove, dwelling primarily at the second port 84 and operative to establish fluid communication between either the first port 82 and the second port 84 if the spool 80 is shifted to the left of the position illustrated in FIG. 2 or, if shifted to the right of the position illustrated in FIG. 2, establish fluid communication between the second port 84 and the third port 86. In the case of the latter, the groove 128 will be in fluid communication with the left most one of the two ports 100 and thus the port 86. Stated another way, when the spool 80 is shifted to the left, fluid communication is established from the port 116 of the variable displacement hydraulic motor to the return line 18 while when the spool is shifted to the right from the position viewed in FIG. 2, that same port will be connected to the supply line 14.

A second annular groove 130 on the spool 80 is also a relatively wide annular groove. The same dwells below the fourth port 88 and if the spool 80 is moved to the left from the position illustrated in FIGS. 2 and 3, connects the third port 86 with the fourth port 88 via the right most one of the ports 100 in the combined housing 70 and sleeve 74. When moved to the right from the position illustrated, the groove 130 is operable to connect the port 88 with the port 90. In the case of the former movement, the line 112 extending to the port 114 in the variable displacement hydraulic motor 34 is connected to the supply line 14 while when the valve 80 shifts to the right, that same line 112 is connected to the return line 18. It will be readily appreciated that this much of the valve 30 so far described controls the direction of rotation and speed of the output 48 of the variable displacement hydraulic motor 34, depending on the direction of displacement and actual displacement from the centered position of the spool 80.

A third annular groove in the spool 80 is designated 132 and dwells primarily in alignment with the sixth port 92. A fourth, relatively narrow annular groove 134 is similarly disposed with respect to the seventh port 94.

Of significance in FIG. 2 is the fact that an elongated channel 136 is disposed in the radially outer side of the sleeve 74 and extends from the sleeve port 98, which is aligned with the second port 84 in the housing, to two openings 138 and 140 to the spool 80 between the annular grooves 132 and 134 which will normally be blocked by a land 144 between the grooves 132 and 134 when the spool 80 is in its centered position as illustrated in FIGS. 2 and 3. Those skilled in the art will appreciate that the centered position illustrated corresponds to a null position on the servo system.

At another radial location, referring to FIG. 3, about the circumference of the inner sleeve 74, the same is provided with another elongated channel 146 which is also located on the radially outer side of the sleeve 74. The channel 146 extends from the sleeve port 102, which is aligned with the fourth port 88 in the housing, to the right to terminate in two ports 148 and 150. The port 148 will normally be on the side of the groove 132 opposite from the port 138 while the port 150 will be on the opposite side of the groove 134 from the port 140. Again, when the spool 80 is centered, the ports 148 and 150 will be blocked by lands 152 and 154 on the spool 80.

Considering the arrangement illustrated in FIGS. 2 and 3 with that shown in FIG. 1, it will be readily appreciated that the ports 92 and 94 will be blocked when the spool 80 is in its centered position. And when the spool 80 is moved to either side of the centered position illustrated in FIGS. 2 and 3, the port 92 will be connected to receive motor inlet pressure from the port 116 the port 114 by reason of the port 84 or the port 88 and the presence of the channels 136 and 146 respectively extending thereto. At the same time, the port 94 will always be connected to receive motor outlet pressure whenever the spool 80 is shifted to either side of its centered position illustrated. This is due to the fact that when the spool 80 is shifted to the right, the groove 134 will establish fluid communication with the port 150 and thus connect the same to the port 88 which at this time will be connected to the port 90 via the groove 130. It is to be specifically noted that the ports 88 and 90 will be at different pressures even though connected due to the flow restriction posed by the interface of the land 152 and the groove 130. When the spool 80 is moved to the left, the port 94 is connected to the return 16 via the groove 134, the opening 140 (FIG. 2) a channel 136 to the second port 84 which is connected to return 16 by reason of the groove 128 underlying the port 82 and being in fluid communication therewith via the sleeve port 96. Again, it should be noted that even though the ports 82 and 84 are connected, the same will be at different pressures due to the flow restriction posed by the lefthand edge of the groove 128.

In any event, those skilled in the art will appreciate that the ports 82, 84, 86, 88 and 90 and the associated grooves 128 and 130 serve to provide direction and speed control for the variable displacement hydraulic motor 34 by connecting one or the other of the lines 110 and 112 to supply 10 and connecting the line not connected to supply 10 to the return 16. Modulation of the spool 80 under the influence of conventional servo direction provides speed control.

Figure 4:
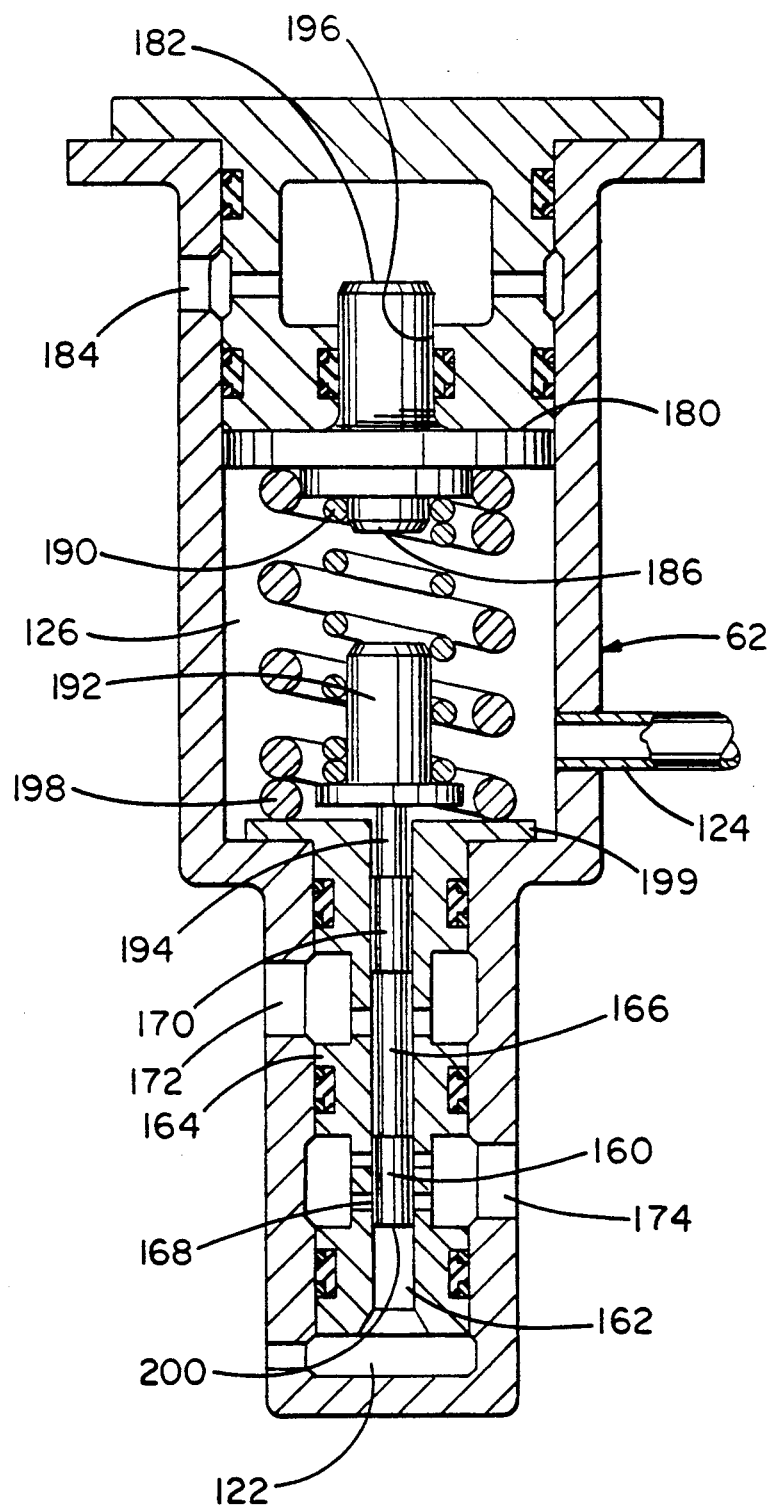
FIG. 4 is a sectional view of a pilot valve employed in the system.

Turning now to FIG. 4, pilot valve 62 and its function will be described. It will be recalled that the pilot chamber 122 is connected via the line 120 to the port 92. It will also be recalled from the prior description that the port 92 is always connected to receive motor inlet when the spool 80 is not centered.

Thus, motor inlet pressure will be acting on one end of a spool 160 received in a bore 162 in a valve sleeve 164. The spool 160 includes a radially outwardly opening annular groove 166 between two lands 168 and 170. The groove 166 will normally be in fluid communication with an annular port 172 in the sleeve 164. The port 172 is connected to the return 16 by the line 18 as can be viewed in FIG. 1.

A second annular port 174 is normally blocked by the land 168. The port 174 is connected via a line 176 (FIG. 1) to the side of the piston 42 opposite the wobbler control arm 40.

Within the spring cavity 126, there is located a piston 180. The piston has one pressure responsive surface 182 which is connected to the supply line 14 via a port 184 as can be appreciated from a consideration of both FIGS. 1 and 4.

The opposite side of the piston 180 includes a pressure responsive surface 186. The net area of surface 186 is the same as the surface 182 and is subject to the pressure that exists at the seventh port 94 of the control valve 30 by reason of the line 124 connecting to the spring cavity 126. It will be recalled that the port 94 will be at motor outlet pressure except when the spool 80 of the control valve 30 is centered, that is, at null.

Contained within the spring cavity 126 is a relatively small compression coil spring 190 which is abutted against the surface 186 of the piston 180 and against a seat 192 which bears against an end 194 of the spool 160. The spring 190 is a compression coil spring and the degree of compression will be dependent upon the position of the piston 180 within its bore 196. The relative compression of spring 190 provides the appropriate system differential pressure setting.

Also within the spring cavity 126 is a relatively large compression coil spring 198. The coil spring 198 has a spring constant or spring rate that is approximately one order of magnitude greater than that of the spring 190 and is interposed between the piston surface 186 and a flange 199 on the sleeve 164. Thus, the spring 198 biases the piston 180 toward the position illustrated in FIG. 4 and acts in opposition to the supply pressure acting on the surface 182.

Those skilled in the art will recognize that the relatively small spring 190 provides a pressure differential setting for the variable displacement hydraulic motor 34.

The pressure in the pilot chamber 122, which is motor inlet pressure, and the pressure in the spring cavity 126, which is motor outlet pressure, act oppositely on equal areas of the spool 160. Consequently, the spool 60 will modulate within the bore 162 to maintain a constant motor inlet to motor outlet pressure differential which is a function of the preload provided by the small spring 190. Supply pressure acting on the surface 182 acts to compress the larger spring 198 in proportion to the actual pressure available at the supply. As supply pressure increases, the larger spring 198 will be further compressed. And, of course, as supply pressure decreases, the larger spring 198 increasingly relaxes.

In any event, the result is a change in the preload of the small spring 190 which in turn results in a change in the modulation of differential pressure from the motor inlet to the motor outlet which is optimized for any given supply pressure applied to the surface 182.

For a fixed pressure in the system, the system pressure compensated wobbler control valve 62 operates as follows. In the case of an opposing load condition, as the pressure differential from the motor inlet to the motor outlet is increased, the small spring 190 moves the spool 160 upwardly as viewed in FIG. 4. This allows flow from the motor inlet to the pilot chamber 122 to flow into the port 174 to the line 176 to the backside of the piston 42, thereby causing clockwise rotation of the wobbler 40 as viewed in FIG. 1 which, in turn, increases displacement. With the resulting increase in displacement, the pressure differential from the motor inlet to the motor outlet will be reduced and as a result, the small spring 190 (FIG. 4) will move the spool 160 in the downward direction as viewed in that Figure. This, in turn, reduces flow from the cavity 122 to the port 174 and results in continual modulation of the spool 160 to maintain a constant motor differential pressure by altering wobbler position as necessary. Specifically, as motor differential pressure is reduced below the desired setting, the spring 190 will move the spool 160 downward as viewed in FIG. 4 and fluid on the backside of the piston 42 will flow through the line 176 to the port 174 and through the annular groove 166 in the spool 160 to the port 172 and ultimately to the return 16. This, in turn, causes a counterclockwise rotation of the wobbler 36 and a decrease in displacement. Motor differential pressure will again increase with a decrease in displacement and again the spool 160 will move upward as viewed in FIG. 4 toward null, modulating as required.

With a change in available system pressure, the resulting change in pressure applied to the surface 182 will permit the piston 180 to move under influence of the large spring 198 and the preload applied by the piston 180 to the small spring 190 will change as previously described. The change in this preload merely changes the differential pressure from the motor inlet to the motor outlet which in turn causes the spool 160 to modulate around its null position and control the position of the wobbler 36. This provides a motor differential pressure control which is optimized as a function of the available system pressure.

As generally alluded to previously, for system stability and to minimize flow to conserve power, it is desirable to operate the variable displacement hydraulic motor 34 at minimum displacement for aiding load situations. Those skilled in the art will recognize that when an aiding load occurs, the motor 34 (FIG. 1) is itself driven by the load through the transmission 52 and in effect acts as a pump as mentioned previously. The main control valve 30 will restrict flow, reducing the pressure applied at the motor inlet 116 while the aiding load will generate an increase in pressure at the motor outlet 114. Again, however, the main control valve 30 and the flow restriction provided thereby will drop the motor outlet pressure to the pressure of the return line 18. Servo control of the main control valve 30 will provide the required back pressure on the motor 34 while acting as a pump to control the aiding load and maintain the desired control over speed of movement.

As stated above, in the aiding load situation, the outlet pressure of the motor 34 is a high pressure. This high pressure is directed to the port 88 via the line 112 and in turn, via the channel 146, to the port 94. It is thus directed via the line 124 to the piston 44, which in turn results in the piston 44 and spring 46 driving the wobbler control arm 40 in a counterclockwise direction to reduce displacement.

When the element providing the aiding load reaches its commanded position, the position transducer 56 will provide an appropriate signal which will ultimately cause the motor control unit 20 to move the spool 80 of the control valve 30 toward a centered position until the commanded position is held. No further movement of the wobbler control piston will occur until a new load position is commanded.

It will thus be appreciated that the wobbler 36 has been moved to a minimum displacement position during the presence of an aiding load, thereby avoiding system instability associated with changes to maximum displacement under aiding load conditions. It will also be appreciated that driving toward minimum displacement during aiding load conditions will conserve hydraulic flow while allowing the system to remain ready to change to any displacement required by loading and speeds of commanded subsequent movements.

We claim:

1. In a hydraulic drive system, the combination of:
   a variable displacement hydraulic motor on a rotary output having a displacement controlling wobbler and adapted to be connected to a load that can alternatively be an opposing load or an aiding load;
   a double acting hydraulic actuator connected to said wobbler for setting the displacement of said motor; and
   means defining a control valve connected to said motor and to said actuator and having a single spool for a) controlling the speed and direction of rotation of said output; and b) controlling a control pressure for said actuator to change the setting of the displacement of said motor.

2. The hydraulic drive system of claim 1 wherein said motor has two ports and said control valve is adapted to connect one motor port to a hydraulic fluid source and the other motor port to a hydraulic fluid return and the reverse to control output direction; and said actuator has two ports and said control valve is operable to maintain connection of one actuator port to one said motor port and the other to the other said motor port or the reverse.

3. The hydraulic drive system of claim 2 further including means defining a system pressure compensated wobbler control pilot valve interposed between one of said actuator ports, said control valve, said one motor port and said other motor port.

4. The hydraulic drive system of claim 3 wherein said pilot valve includes a valve member for alternatively connecting said one actuator port to said control valve and said return and a pressure activated biasing means for said valve member including a spring linked to said valve member and a pressure activated piston connected to said source for selectively compressing said spring in response to pressure at said source.

5. The hydraulic drive system of claim 4 wherein said piston includes a first pressure surface connected to said source and a second, opposing pressure surface connected to said return.

6. The hydraulic drive system of claim 5 further including an additional spring biasing said piston in concert with said second pressure surface.

7. The hydraulic drive system of claim 3 wherein said pilot valve includes first, second and third ports, a valve member movable to establishing fluid communication between said first and second ports and between said second and third ports; said first port being connected to said return and said second port being connected to said one actuator port, said third port being connectable to said one motor port; said pilot valve further including a spring biasing said valve member toward a position connecting said second and third ports and means for sensing source pressure and for varying the bias provided by said spring in response thereto.

8. The hydraulic drive system of claim 7 wherein said sensing means comprises a movable piston having opposed pressure surfaces and movable to vary the compression of said spring, one of said surfaces being connected to said source, the other of said surfaces being connectable to said return and acting on said spring, and an additional spring acting on said piston in opposition to said system pressure.

9. The hydraulic drive system of claim 8 wherein said additional spring has a spring rate about one order of magnitude greater than that of said spring.

10. In a hydraulic drive system, the combination of:
    a source of hydraulic fluid under pressure;
    a variable displacement hydraulic motor on a rotary output having a displacement controlling wobbler and adapted to be connected to a load that can alternatively be an opposing load or an aiding load, said motor having an inlet port and an outlet port;
    a double acting hydraulic actuator connected to said wobbler for setting the displacement of said motor, said actuator having two ports;
    a control valve connected to said motor for controlling the speed and direction of said output; and
    means defining a system pressure compensated wobbler control pilot valve interposed between one of the said actuator ports and said source and said motor for changing the pressure differential across aid motor inlet port and said motor outlet port as a function of said source fluid pressure.

11. The hydraulic drive system of claim 10 wherein said pilot valve includes a valve member for alternatively connecting said one actuator port to said control valve and to a hydraulic fluid return and a pressure activated biasing means for said valve member including a spring linked to said valve member and a pressure activated piston connected to said source for selectively compressing said spring in response to pressure at said source.

12. The hydraulic drive system of claim 11 wherein said piston includes a first pressure surface connected to said source and a second, opposing pressure surface connected to the other of said ports.

13. The hydraulic drive system of claim 12 further including an additional spring biasing said piston in concert with said second pressure surface.

14. The hydraulic drive system of claim 10 wherein said pilot valve includes first, second and third ports, a valve member movable to establishing fluid communication between said first and second ports and between said second and third ports; said first port being connected to said return and said second port being connected to said one actuator port, said third port being connectable to said one motor port; said pilot valve further including a spring biasing said valve member toward a position connecting said second and third ports and means for sensing source pressure and for varying the bias provided by said spring in response thereto.

15. The hydraulic drive system of claim 14 wherein said sensing means comprises a movable piston having opposed pressure surfaces and movable to vary the compression of said spring, one of said surfaces being connected to said source, the other of said surfaces being connectable to said return and acting on said spring, and an additional spring acting on said piston in opposition to said system pressure.

16. The hydraulic drive system of claim 15 wherein said additional spring has a spring rate about one order of magnitude greater than that of said spring.

17. The hydraulic drive system of claim 10 wherein said control valve includes a single spool defining means for controlling a) the speed and direction of said output, and b) said actuator to change the displacement of said motor.

18. The hydraulic drive system of claim 17 wherein said motor has two ports connected to said control valve and said spool is movable in one direction from a centered position to connect one motor port to said source and the other motor port to said return, and movable in the opposite direction from said centered position to connect said other motor port to said source and said one motor port to said return, and when not in said centered position connecting said pilot valve to said source and the other of said actuator ports to said return.

19. The hydraulic drive system of claim 18 wherein said control valve includes a housing having first through seventh laterally spaced ports, with the first and fifth ports connected to said return, the third port connected to said source and the second and fourth ports connected to said motor; a spool receiving bore in said housing with said spool therein and a sleeve in said bore about said spool and slidably receiving said spool, said sleeve having first through seventh ports in fluid communication with the corresponding housing port, said sleeve further having axial passages interconnecting said second housing port with either said sixth or seventh sleeve port when said spool is moved from said centered position dependent upon the direction of such movement and for connecting said fourth housing port with either said seventh or sixth sleeve port when said spool is similarly moved from said centered position.

* * * * *